United States Patent
Sasaki et al.

(10) Patent No.: US 12,431,273 B2
(45) Date of Patent: Sep. 30, 2025

(54) INDUCTOR COMPONENT AND METHOD FOR MANUFACTURING SAME

(71) Applicant: Murata Manufacturing Co., Ltd., Kyoto-fu (JP)

(72) Inventors: Tatsuya Sasaki, Nagaokakyo (JP); Shinya Hirai, Nagaokakyo (JP); Yuuji Igarashi, Nagaokakyo (JP); Shin Hasegawa, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 718 days.

(21) Appl. No.: 17/223,869

(22) Filed: Apr. 6, 2021

(65) Prior Publication Data
US 2021/0319942 A1    Oct. 14, 2021

(30) Foreign Application Priority Data

Apr. 8, 2020   (JP) ................................. 2020-069866

(51) Int. Cl.
*H01F 17/06* (2006.01)
*H01F 27/29* (2006.01)
*H01F 41/04* (2006.01)

(52) U.S. Cl.
CPC ......... *H01F 17/062* (2013.01); *H01F 27/292* (2013.01); *H01F 41/041* (2013.01)

(58) Field of Classification Search
CPC .. H01F 17/062; H01F 27/292; H01F 27/2895; H01F 27/306
USPC .......................................... 335/221; 336/221
See application file for complete search history.

(56) References Cited

U.S. PATENT DOCUMENTS

| | | | | |
|---|---|---|---|---|
| 4,103,267 A | * | 7/1978 | Olschewski | H05K 1/165 336/200 |
| 4,583,068 A | * | 4/1986 | Dickens | H01F 27/2866 336/212 |
| 9,312,059 B2 | * | 4/2016 | Dinh | H01F 27/28 |
| 10,403,431 B2 | * | 9/2019 | Banba | H01F 27/255 |
| 10,424,430 B2 | * | 9/2019 | Nishide | H01F 41/046 |
| 10,553,347 B2 | * | 2/2020 | Banba | H01F 27/2823 |
| 12,176,133 B2 | * | 12/2024 | Hundt | H01F 17/062 |
| 2002/0121959 A1 | * | 9/2002 | Fontana | H01F 27/06 336/200 |
| 2003/0025585 A1 | * | 2/2003 | Macerini | H01F 27/2804 29/606 |

(Continued)

FOREIGN PATENT DOCUMENTS

| CN | 1288241 A | * | 3/2001 | ........... H01F 27/306 |
|---|---|---|---|---|
| CN | 101471173 A | * | 7/2009 | |

(Continued)

*Primary Examiner* — Shawki S Ismail
*Assistant Examiner* — Joselito S. Baisa
(74) *Attorney, Agent, or Firm* — Studebaker Brackett PLLC

(57) ABSTRACT

An inductor component having such a characteristic property that the assembly of the inductor component can be made simple and the welded state in the inductor component can be made stable. The inductor component comprises a ring-shaped core; a coil which comprises a plurality of pin members, and in which adjacent pin members are connected and are wound around the coil; and a connecting member which connects the pin members adjacent to each other in a direction of an axis of the coil.

17 Claims, 9 Drawing Sheets

(56) References Cited

U.S. PATENT DOCUMENTS

| | | | |
|---|---|---|---|
| 2006/0114094 A1* | 6/2006 | Jean | H01F 27/027 336/182 |
| 2012/0133473 A1* | 5/2012 | Shih | H01F 27/292 336/200 |
| 2016/0181007 A1* | 6/2016 | Shiokawa | H01F 41/08 29/606 |
| 2017/0316858 A1* | 11/2017 | Otsubo | H01F 17/0013 |
| 2019/0371520 A1* | 12/2019 | Pasko | H01R 4/021 |
| 2021/0217550 A1* | 7/2021 | Hundt | H01F 41/08 |

FOREIGN PATENT DOCUMENTS

| | | | |
|---|---|---|---|
| CN | 101587769 A | * | 11/2009 |
| JP | S50-020152 A | | 3/1975 |
| JP | S55-16436 A | | 2/1980 |
| JP | H102-4218 U | | 1/1990 |
| JP | 2003-347130 A | | 12/2003 |
| JP | 2004087854 A | * | 3/2004 |
| JP | 2004266081 A | * | 9/2004 |
| JP | 2015153967 A | * | 8/2015 |
| JP | 2015-173189 A | | 10/2015 |
| JP | 2015-177166 A | | 10/2015 |
| JP | 2016-187031 A | | 10/2016 |

* cited by examiner

INDUCTOR COMPONENT AND METHOD FOR MANUFACTURING SAME

CROSS-REFERENCE TO RELATED APPLICATION

This application claims benefit of priority to Japanese Patent Application No. 2020-069866, filed Apr. 8, 2020, the entire content of which is incorporated herein by reference.

BACKGROUND

Technical Field

The present disclosure relates to an inductor component and a method for manufacturing the inductor component.

Background Art

Heretofore, as an inductor component, one disclosed in Japanese Unexamined Utility Model Application Publication No. 50-20152 is known. The inductor component comprises a ring-shaped core and a coil wound around the core. The coil includes a U-shaped wire member and a straight wire member, and an end part of the U-shaped wire member and an end part of the straight wire member are welded to each other to form a single turn of the coil.

SUMMARY

When it is intended to assemble a conventional inductor component as mentioned above, it is required to arrange and weld the wire members one by one at predetermined positions. Because it is required to arrange the wire members one by one at predetermined positions, it takes efforts to assemble the inductor component. Furthermore, because it is required to arrange and weld the wire members one by one at predetermined positions, misalignment of relative positions of wire members that are adjacent to each other in the direction of the axis of the coil may occur during welding, and thereby the welded state of the wire members may not become stable.

In these situations, the present disclosure provides an inductor component for which the assembling can be simplified and in which the welded state can be made stable; and a method for manufacturing the inductor component.

An inductor component according to one aspect of the present disclosure comprises a ring-shaped core; a coil which comprises a plurality of pin members, and in which adjacent pin members are connected and are wound around the coil; and a connecting member which connects the pin members adjacent to each other in a direction of an axis of the coil.

In this regard, the term "direction of the axis of the coil" refers to a direction of a center axis of the spiral of the coil, and the term "circumferential direction of the coil" refers to a direction in which the pin members wound around the core extend.

According to this aspect, because the connecting member can connect pin members that are adjacent to each other in the direction of the axis of the coil together, the pin members that are adjacent to each other in the direction of the axis of the coil can be formed in a block. Therefore, when it is tried to assemble the inductor component, the pin members adjacent to each other in the direction of the axis of the coil can be arranged integrally at predetermined positions, and thereby the assembling of the pin members can be made simple. Furthermore, the misalignment of relative positions of the pin members adjacent to each other in the direction of the axis of the coil can be reduced, and thereby the insulation between the adjacent pin members can be achieved more reliably. Furthermore, when pin members adjacent to each other in the circumferential direction of the coil are welded, the welding can be carried out after arranging the pin members adjacent to each other in the direction of the axis of the coil integrally at predetermined positions. Therefore, the pin members can be welded while fixing the relative positions of the pin members adjacent to each other in the direction of the axis of the coil, and thereby the welded state of the pin members can be made stable.

Preferably in one embodiment of the inductor component, the pin members that are adjacent to each other in a circumferential direction of the coil share a welded portion at which the pin members are welded to each other; and the connecting member is located at a different position from the welded portion.

According to this embodiment, because the connecting member is located at a different position from the welded portion, the connecting member is less likely to be affected by heat generated as the result of welding upon the welding of the pin members adjacent to each other in the circumferential direction of the coil.

Preferably in one embodiment of the inductor component, the connecting member is arranged at a position which faces at least one of an inner peripheral surface and an outer peripheral surface of the core.

According to this embodiment, because the connecting member is arranged at a position which faces at least one of an inner peripheral surface and an outer peripheral surface of the core, the size of the core in the inductor component as observed in the direction of the center axis of the core can be reduced.

Preferably in one embodiment of the inductor component, the connecting member is located on an opposite side to the welded portion with respect to the core.

According to this embodiment, because the connecting member is located at a position opposite to the welded portion with respect to the core, the connecting member is located at a position apart from the welded portion, and thereby the connecting member is less likely to be affected by heat generated as the result of the welding.

Preferably in one embodiment of the inductor component, the connecting member is located at a center part of each of the pin members in a direction to which the pin members extend.

According to this embodiment, because the connecting member is located at a center part of each of the pin members in the direction to which the pin members extend, the connecting member is located at a position apart from each end (i.e., a welded portion) of each of the pin members, and thereby the connecting member is less likely to be affected by heat generated as the result of the welding.

Preferably in one embodiment of the inductor component, at least a portion of the connecting member exists between pin members adjacent to each other in a direction of an axis of the coil.

According to this embodiment, because the connecting member exists between the pin members that are adjacent to each other in the direction of the axis of the coil, the misalignment of relative positions of the pin members adjacent to each other in the direction of the axis of the coil can be reduced.

Preferably in one embodiment of the inductor component, in a cross section orthogonal to a circumferential direction of the coil, a thickness of a portion of the connecting member which exists between pin members adjacent to each other in a direction of an axis of the coil is equal to or less than a thickness of each of the pin members.

The term "thickness" refers to a length as observed in the core axis direction on a cross section orthogonal to the circumferential direction of the coil.

According to this embodiment, the thickness of the connecting member can be reduced, and thereby the size of the inductor component can be reduced.

Preferably in one embodiment of the inductor component, the core has a first end surface and a second end surface which face each other in a direction of a center axis of the core, and the connecting member is arranged at a position which faces the first end surface or the second end surface.

According to this embodiment, because the connecting member is arranged at a position which faces the first end surface or the second end surface, the connecting member does not affect the size of the core in the diameter direction. As a result, the size of the core can be increased in the diameter direction.

Preferably in one embodiment of the inductor component, all of the pin members connected by the connecting member are arranged in parallel with each other and are lined up along a direction of an axis of the coil.

According to this embodiment, because all of pin members connected together by the connecting member are arranged in parallel with each other and are lined up along the direction of the axis of the coil, the pin members can be aligned, and thereby the coil properties can be improved.

Preferably in one embodiment of the inductor component, with respect to all of the pin members connected together by the connecting member, the connecting member is located at a center part of each of the pin members in a direction to which the pin members extend.

According to this embodiment, with respect to all of the pin members connected together by the connecting member, the connecting member is located at a center part of each of the pin members in the direction to which the pin members extend. Thus, the moment forces that the pin members respectively receive by the connecting member can be made at the same level, and thereby the misalignment of relative positions of the pin members adjacent to each other in the direction of the axis of the coil can be prevented.

A method for manufacturing an inductor component according to one aspect of the present disclosure is a method for manufacturing an inductor component. The inductor component includes a ring-shaped core, and a coil which comprises a plurality of first pin members and a plurality of second pin members, and in which a first pin member and a second pin member adjacent to each other are connected to each other and are wound around the core. The method comprises the steps of arranging the plurality of first pin members in parallel with each other and connecting the first pin members integrally by a first connecting member, and arranging the plurality of second pin members in parallel with each other and connecting the second pin members integrally by a second connecting member. The method further comprises arranging the plurality of first pin members and the plurality of second pin members around the core in such a manner that an end part of each of the first pin members and an end part of each of the second pin members can come into contact with each other; and welding the end part of each of the first pin members and the end part of each of the second pin members to each other.

According to this aspect, because the plurality of first pin members are connected integrally by the first connecting member and the plurality of second pin members are connected integrally by the second connecting member and then the plurality of first pin members and the plurality of second pin members are arranged around the core, it becomes possible to arrange the pin members adjacent to each other in the direction of the axis of the coil integrally at predetermined positions, and thereby the assembling of the pin members can be made simple upon the assembling of the inductor component.

Furthermore, because the pin members adjacent to each other in the direction of the axis of the coil are arranged integrally at predetermined positions and then end parts of the first pin members and end parts of the second pin members are welded, it becomes possible to weld the pin members while fixing the relative positions of the pin members adjacent to each other in the core axis direction, and thereby the welded state of the pin members can be made stable.

According to the inductor component and the method for producing the inductor component which are aspects of the present disclosure, it becomes possible to simplify the assembling of the inductor component and to make the welded state stable.

DETAILED DESCRIPTION

Figure 1:
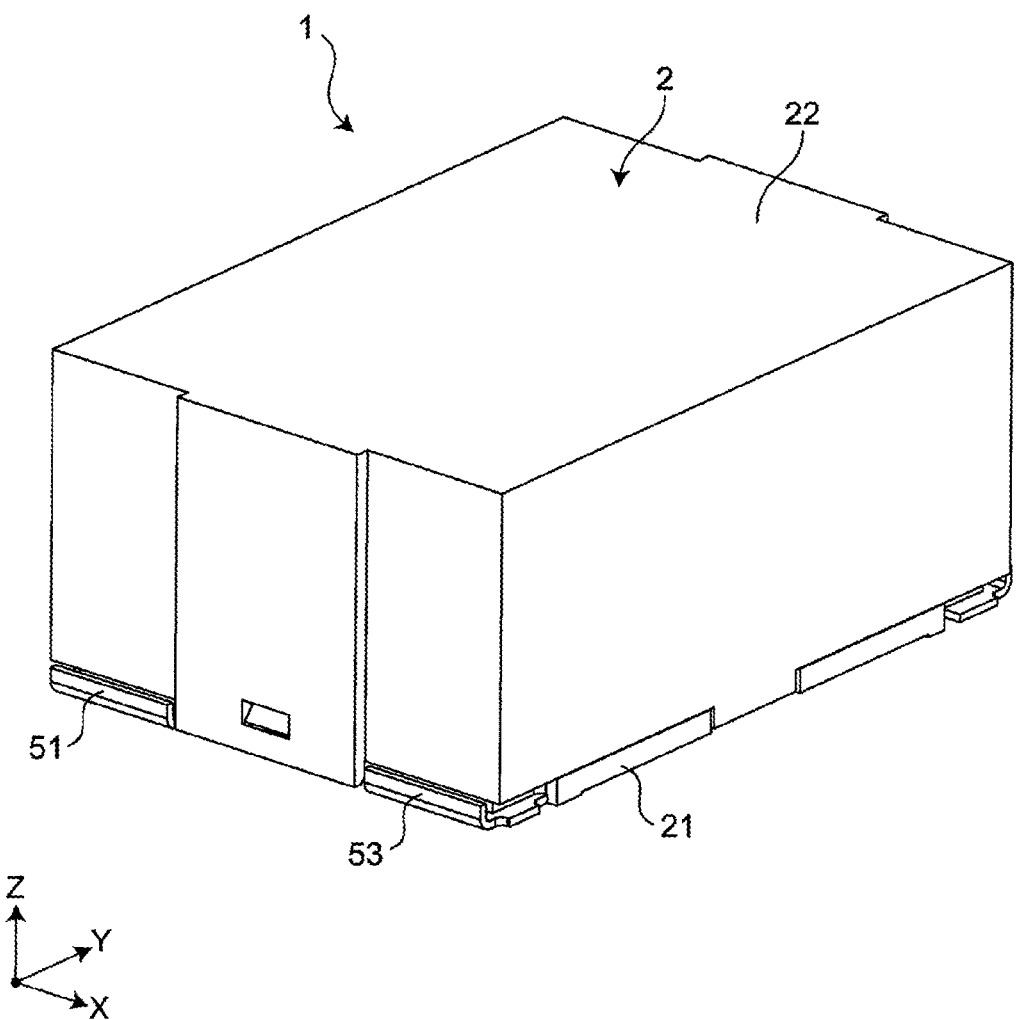
FIG. 1 is an upper perspective view showing an inductor component according to a first embodiment of the present disclosure.

Hereinbelow, an inductor component, which is one aspect of the present disclosure, is described in more detail with reference to the embodiments shown in the drawings. The drawings include some schematic ones, in which real dimensions and proportions may not be reflected.

First Embodiment (Configuration of Inductor Component)

Figure 2:
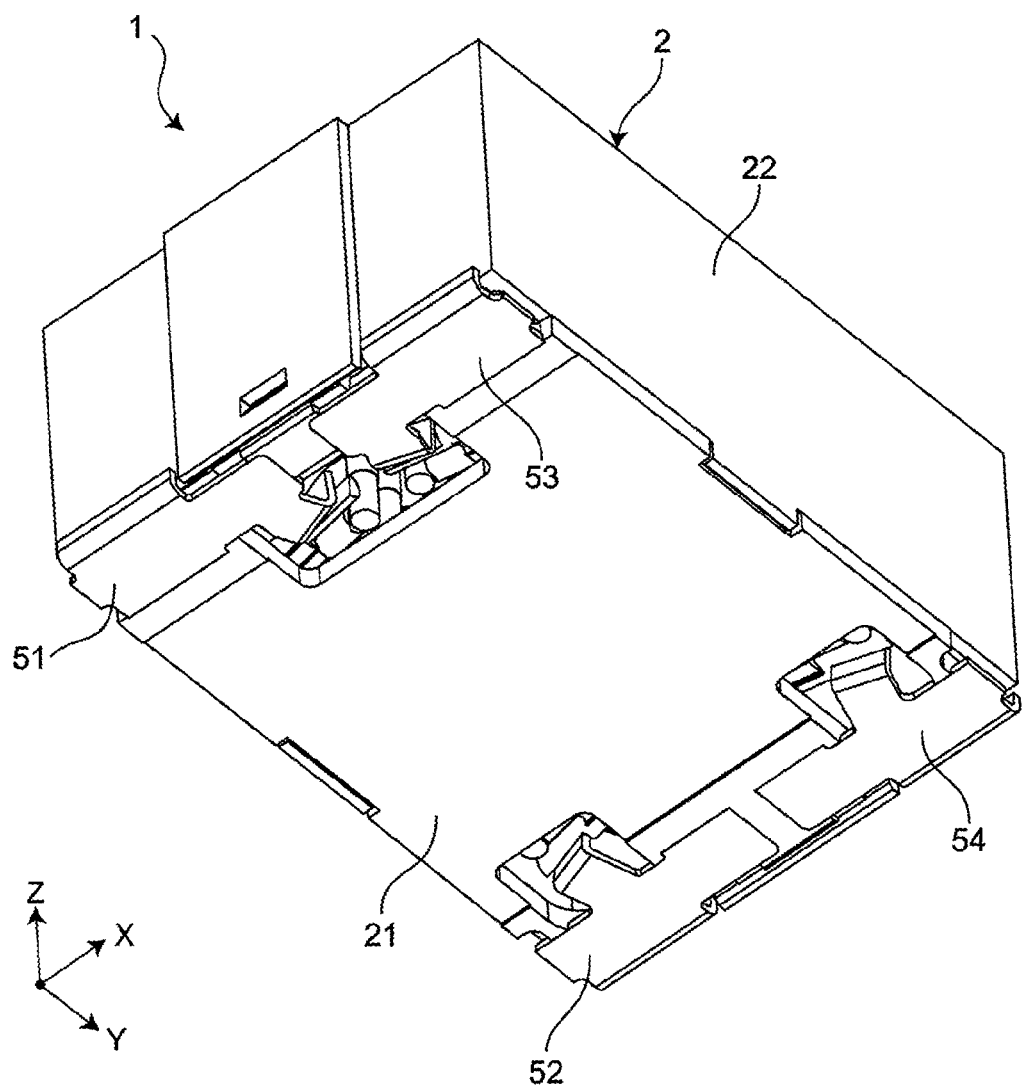
FIG. 2 is a lower perspective view of the inductor component.
Figure 3:
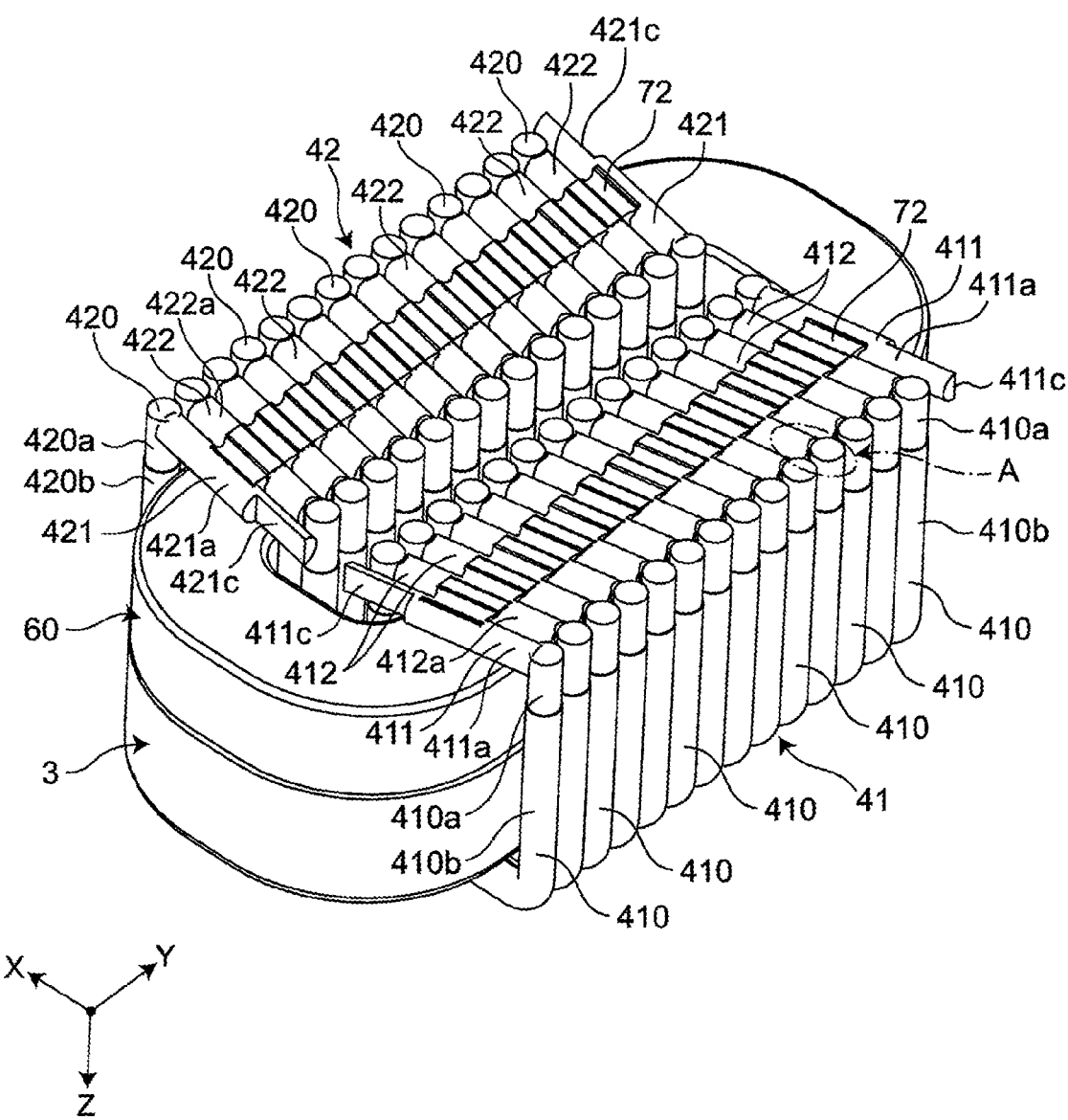
FIG. 3 is a lower perspective view showing the inside of the inductor component.
Figure 4:
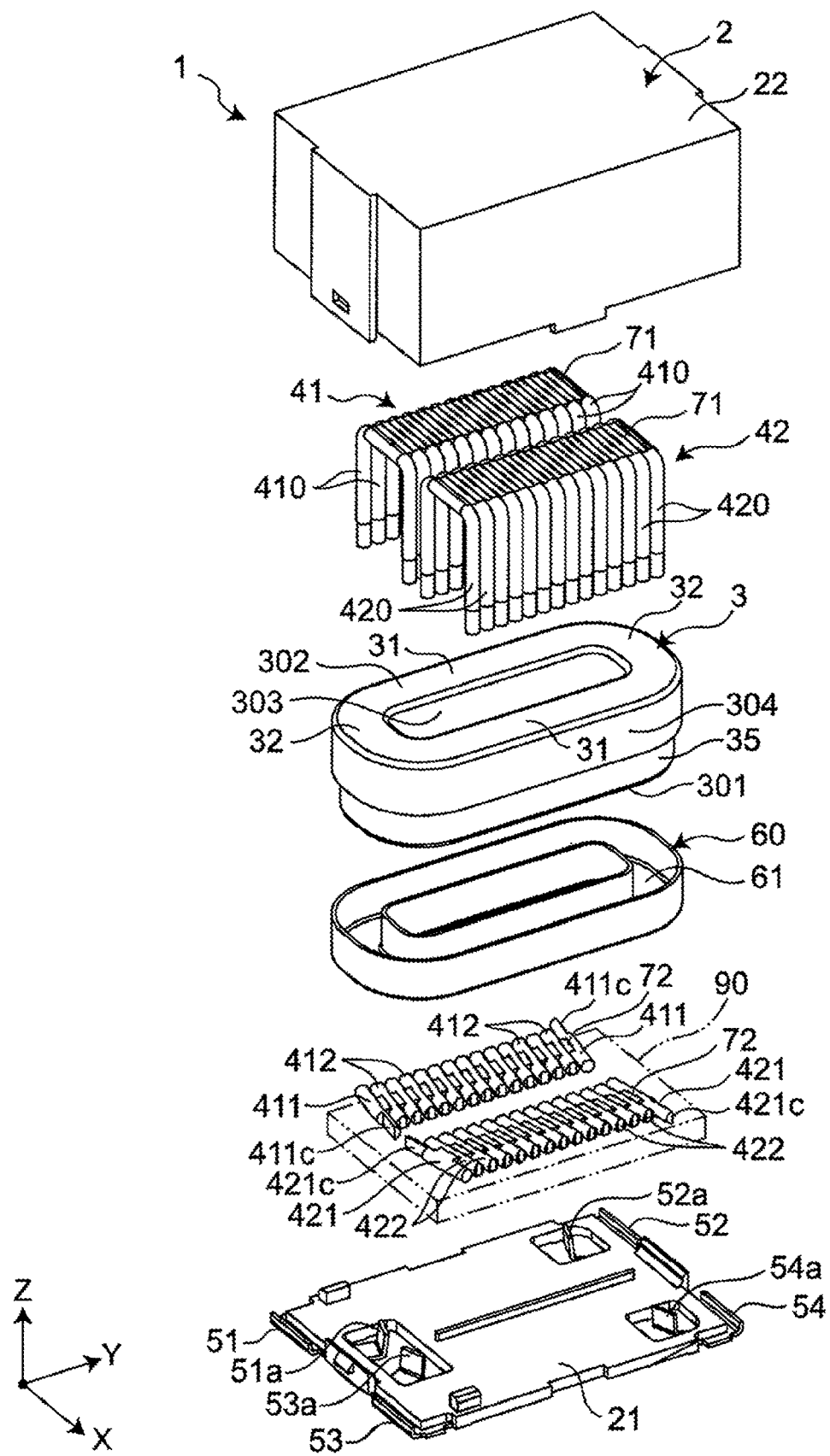
FIG. 4 is an exploded perspective view of the inductor component.

FIG. 1 is an upper perspective view showing an inductor component according to one embodiment of the present disclosure. FIG. 2 is a lower perspective view of the inductor component. FIG. 3 is a lower perspective view showing the inside of the inductor component. FIG. 4 is an exploded perspective view of the inductor component.

As shown in FIGS. 1 to 4, an inductor component 1 comprises a case 2, a ring-shaped core 3 housed in the case 2, a first coil 41 and a second coil 42 both wound around the core 3, and a first electrode terminal 51 to a fourth electrode terminal 54 attached to the case 2 and connected to the first coil 41 and the second coil 42. One example of the inductor component 1 is a common mode choke coil.

The case 2 comprises a bottom plate part 21 and a box-shaped lid part 22 that covers the bottom plate part 21. The case 2 is made from a material having strength and heat resistance, preferably a material having flame retardancy. The case 2 is made from, for example, a resin such as polyphenylene sulfide (PPS), a liquid crystalline polymer (LCP) and polyphthalamide (PPA) or a ceramic. On the bottom plate part 21, the core 3 is placed in such a manner that a center axis of the core 3 intersects the bottom plate part 21 at right angles. The term "center axis of the core 3" as used herein refer to a center axis of an inner-diameter hole part of the core 3. The shape of the case 2 (including the bottom plate part 21 and the lid part 22) is quadrilateral as observed from the direction of the center axis of the core 3. In this embodiment, the shape of the case 2 is rectangular.

It is defined as follows: the shorter axis direction of the case 2 as observed from the direction of the center axis of the core 3 is X-direction, the longer axis direction of the case 2 as observed from the direction of the direction of the center axis of the core 3 is Y-direction, and the height direction of the case 2 which is a direction perpendicular to both of the X-direction and the Y-direction is Z-direction. The bottom plate part 21 and the lid part 22 in the case 2 are arranged so as to face each other in Z-direction, in which the bottom plate part 21 is located on a lower side and the lid part 22 is located on an upper side. The direction toward the upper side is defined as a forward direction of the z-direction, and the direction toward the lower side is defined as a backward direction of the z-direction. In the case where the shape of the bottom plate part 21 of the case 2 is square, the length of the case 2 in the X-direction is identical to the length of the case 2 in the Y-direction.

The first to fourth electrode terminals 51 to 54 are attached to the bottom plate part 21. The first electrode terminal 51 and the second electrode terminal 52 are located at two corners that face each other in the Y-direction on the bottom plate part 21, and the third electrode terminal 53 and the fourth electrode terminal 54 are located at two corners that face each other in the Y-direction on the bottom plate part 21. The first electrode terminal 51 and the third electrode terminal 53 face each other in the X-direction, and the second electrode terminal 52 and the fourth electrode terminal 54 face each other in the X-direction.

The shape of the core 3 is oval (track-like shape) as observed from the directions of the center axis of the core 3. The core 3 includes a pair of longer-side parts 31 which extend along the longer axis and face each other in the shorter axis direction and a pair of shorter-side parts 32 which extend along the shorter axis and face each other in the longer axis direction as observed from the center axis direction. The shape of the core 3 may be rectangular or elliptic as observed from the center axis direction.

The core 3 is composed of, for example, a ceramic core made from ferrite or the like or a magnetic core made from an iron-based powder molded article or a nano-crystal foil. The core 3 has a first end surface 301 and a second end surface 302 which face each other in the center axis direction and an inner peripheral surface 303 and an outer peripheral surface 304. The first end surface 301 is an end surface located on the lower side of the core 3 and faces the inner surface of the bottom plate part 21. The second end surface 302 is an end surface located on the upper side of the core 3 and faces the inner surface of the lid part 22. The core 3 is housed in the case 2 in such a manner that the longer axis direction of the core 3 can be consistent with the Y-direction.

The shape of a cross section of the core 3 which is orthogonal to a direction in which the core 3 extends in a ring-shape is quadrilateral. The first end surface 301 and the second end surface 302 are arranged perpendicular to the direction of the center axis of the core 3. The inner peripheral surface 303 and the outer peripheral surface 304 are arranged in parallel with the direction of the center axis of the core 3. The term "perpendicular" as used herein includes an absolutely perpendicular state as well as a substantially perpendicular state. The term "parallel" as used herein includes an absolutely parallel state as well as a substantially parallel state.

The lower side part of the core 3 is covered with an insulating member 60. The insulating member 60 is made from, for example, a super engineering plastic such as LCP, PPA and PPS, and therefore the heat resistance, insulation properties and processability of the insulating member 60 can be improved.

The insulating member 60 is formed into a ring-shaped form, and has a ring-shaped depressed part 61 that covers the lower side part of the core 3. The insulating member 60 can be installed on the core 3 by fitting the lower side part of the core 3 into the ring-shaped depressed part 61 of the insulating member 60.

The core 3 has a fitting groove 35 into which the insulating member 60 is fitted. The fitting groove 35 is opened at a first end surface 301, an inner peripheral surface 303 and an outer peripheral surface 304 of the core 3. The extension of the insulating member 60 beyond the edge of the outside of the core 3 diameter direction can be reduced by fitting the outer peripheral surface of the insulating member 60 into the fitting groove 35 of the core 3. Furthermore, it becomes possible to make the installation of the insulating member 60 more easy and the misalignment of the insulating member 60 can be prevented.

The first coil 41 is wound around the core 3 and the insulating member 60 in an area between the first electrode terminal 51 and the second electrode terminal 52. One end of the first coil 41 is connected to the first electrode terminal 51. The other end of the first coil 41 is connected to the second electrode terminal 52.

The second coil 42 is wound around the core 3 and the insulating member 60 in an area between the third electrode terminal 53 and the fourth electrode terminal 54. One end of the second coil 42 is connected to the third electrode terminal 53. The other end of the second coil 42 is connected to the fourth electrode terminal 54.

The first coil 41 and the second coil 42 are wound along the longer axis direction. That is, the first coil 41 is wound around one of the longer-side parts 31 of the core 3, and the second coil 42 is wound around the other of the longer-side parts 31 of the core 3. The axis of the first coil 41 and the axis of the second coil 42 extend in parallel with each other. The term "direction of the axis of the first coil 41" refers to the direction of a center axis of the spiral of the first coil 41, and term "direction of the axis of the second coil 42" refers to the direction of a center axis of the spiral of the second coil 42. The first coil 41 and the second coil 42 become symmetrical with respect to the longer axis of the core 3.

The number of winding turns of the first coil 41 and that of the second coil 42 are the same as each other. The direction of winding of the first coil 41 around the core 3 and the direction of winding of the second coil 42 around the core 3 are opposite to each other. That is, the direction of winding of the first coil 41 from the first electrode terminal 51 toward the second electrode terminal 52 and that of the second coil 42 from the third electrode terminal 53 toward the fourth electrode terminal 54 are opposite to each other.

A common-mode electric current flows from the first electrode terminal 51 toward the second electrode terminal 52 in the first coil 41, and also flows from the third electrode terminal 53 toward the fourth electrode terminal 54 in the second coil 42. That is, the first to fourth electrode terminals 51 to 54 are connected in such a manner that the direction of the flow of the common-mode electric current in the first coil 41 and that in the second coil 42 can become identical to each other. When the common-mode electric current flows in the first coil 41, a first magnetic flux generates by the action of the first coil 41 in the core 3. When the common-mode electric current flows in the second coil 42, a second magnetic flux generates in the core 3 in such a direction that the second magnetic flux can be intensified with the first magnetic flux in the core 3. As a result, the first coil 41 and the core 3 and the second coil 42 and the core 3 act as inductance components, and thereby noises against the common-mode electric current can be removed.

The first coil 41 is composed of a plurality of pin members which are connected to each other by welding such as laser welding and spot welding. FIG. 3 illustrates a state where the plurality of pin members are assembled, rather than a state where the plurality of pin members are actually welded.

The plurality of pin members are bar-shaped members, rather than printed wirings or conducting wires. Each of the pin members has rigidity and is more difficult to bent than a conducting wire that has been used for the connection between electric component modules.

Each of the plurality of pin members includes bent pin members 410 each of which is bent in an approximately U-shape and straight pin members 411, 412 each of which extends in an approximately straight-line-like shape (i.e., an approximately I-shape). In this embodiment, the bent pin members 410 correspond to the "first members", and the straight pin members 411 and 412 correspond to the "second members", described in the claims.

Figure 5:
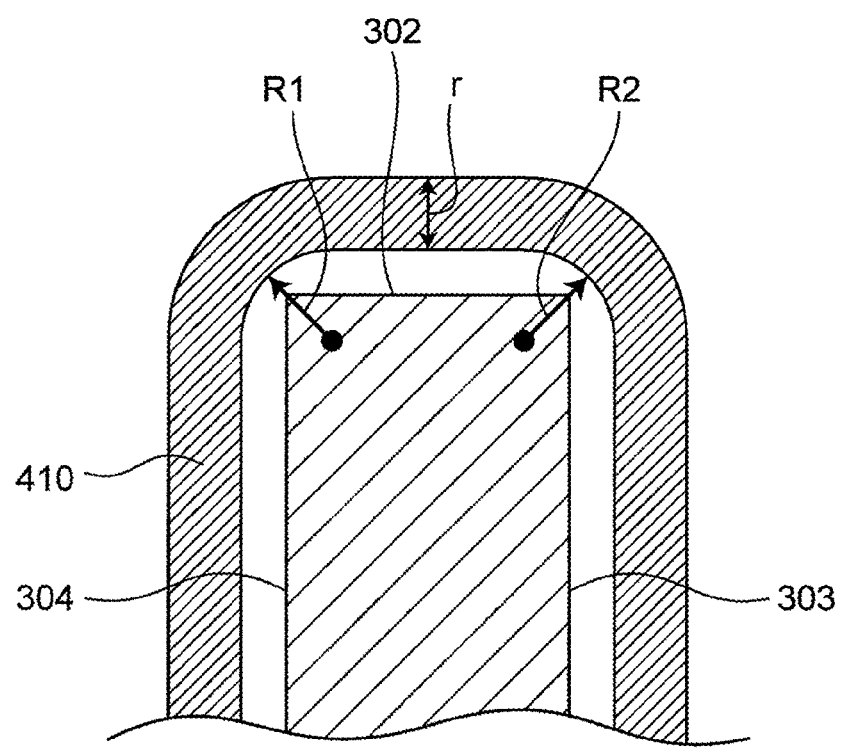
FIG. 5 is a sectional view of the inductor component.

The first coil 41 includes, in the direction from one end toward the other end, a (one) first straight pin member 411 located on one end side, a plurality of (bent pin member 410)-(second straight pin member 412) sets, and a (the other) first straight pin member 411 located on the other end side. The length of the first straight pin member 411 and that of the second straight pin member 412 are different from each other. The spring index of a bent pin member 410 is described here. When the bent pin member 410 is wound around the second end surface 302, the inner peripheral surface 303 and the outer peripheral surface 304 of the core 3 as shown in FIG. 5, the spring index Ks of the bent pin member 410 at each of a radius of curvature R1 of the bent pin member 410 located at a corner part of the outer peripheral surface 304 of the core 3 and a radius of curvature R2 of the bent pin member 410 located at a corner of the inner peripheral surface 303 of the core 3 is smaller than 3.6. The spring index Ks is expressed by the formula: (radius of curvature R1, R2 of the bent pin member)/(wire diameter r of the bent pin member). As mentioned above, the bent pin member 410 has high rigidity and cannot be bent easily.

The bent pin members 410 and the second straight pin members 412 are connected alternatively by welding such as laser welding and spot welding. One end of a second straight pin member 412 is connected to one end of a bent pin member 410, and the other end of the second straight pin member 412 is connected to one end of another bent pin member 410. By repeating this procedure, a plurality of the bent pin members 410 and a plurality of the second straight pin members 412 are connected. The plurality of the bent pin members 410 and the plurality of the second straight pin members 412 thus connected are wound spirally around the core 3. That is, a single (bent pin member 410)-(second straight pin member 412) set constitute a unit element of a single turn.

The bent pin members 410 are arranged in parallel with each other along each of the second end surface 302, the inner peripheral surface 303 and the outer peripheral surface 304 of the core 3. The second straight pin members 412 are arranged in parallel with each other along the first end surface 301 of the core 3. The first straight pin members 411 are arranged in parallel with each other along the first end surface 301 of the core 3.

The first electrode terminal 51 is connected to one end of one of the first straight pin members 411, and the other end of the one of the first straight pin members 411 is connected to one end of a bent pin member 410 adjacent to the one of the first straight pin members 411. The one end of the one of the first straight pin members 411 has an attachment strip 411c. The first electrode terminal 51 has an attachment part 51a that enters the case 2. The attachment strip 411c in the one of the first straight pin members 411 is connected to the attachment part 51a in the first electrode terminal 51.

The second electrode terminal 52 is connected to one end of the other of the first straight pin members 411, and the other end of the other of the first straight pin members 411 is connected to one end of a second straight pin member 412 adjacent to the other of the first straight pin members 411. The attachment strip 411c at one end of the other of the first straight pin members 411 is connected to an attachment part 52a of the second electrode terminal 52.

Like the first coil 41, the second coil 42 is also composed of a plurality of pin members. The second coil 42 includes, in the direction from one end toward the other end, a (one) first straight pin member 421 located on one end side, a plurality of (bent pin member 420)-(second straight pin member 422) sets, and a (the other) first straight pin member 421 located on the other end side. The bent pin members 420 and the second straight pin members 422 are connected alternatively and are wound around the core 3. That is, the plurality of bent pin members 420 and the plurality of second straight pin members 422 are connected, and the plurality of bent pin members 420 and the plurality of second straight pin members 422 thus connected are wound spirally around the core 3.

The third electrode terminal 53 is connected to one end of one of the first straight pin members 421, and the other end of the one of the first straight pin members 421 is connected to one end of a bent pin member 420 adjacent to the one of the first straight pin members 421. The attachment strip 421c at one end of the one of the first straight pin members 421 is connected to an attachment part 53a of the third electrode terminal 53.

The fourth electrode terminal 54 is connected to one end of the other of the first straight pin members 421, and the other end of the other of the first straight pin members 421 is connected to one end of a second straight pin member 412 adjacent to the other of the first straight pin members 421. The attachment strip 421c at one end of the other of the first straight pin members 421 is connected to an attachment part 54a of the fourth electrode terminal 54.

As shown in FIG. 3, each of the first coil 41 and the second coil 42 (respectively including the pin members 410 to 412 and the pin members 420 to 422) includes an electrically conductive body part and a coating film that covers the electrically conductive body part. One example of the electrically conductive body part is a copper wire, and one example of the coating film is a polyamideimide resin. The thickness of the coating film is, for example, 0.02 to 0.04 mm The first straight pin member 411, 421 is composed of an electrically conductive body part 411a, 421a having no coating film. The second straight pin member 412, 422 is composed of an electrically conductive body part 412a, 422a having no coating film. The bent pin member 410, 420 is composed of an electrically conductive body part 410a, 420a and a coating film 410b, 420b.

The electrically conductive body part 410a, 420a is exposed from the coating film 410b, 420b at one end and the other end of the bent pin member 410, 420. That is, the first straight pin member 411, 421, the second straight pin member 412, 422 and the bent pin member 410, 420 are welded to one another at the exposed electrically conductive body part 411a, 421a, 412a, 422a, 410a, 420a.

Figure 6A:
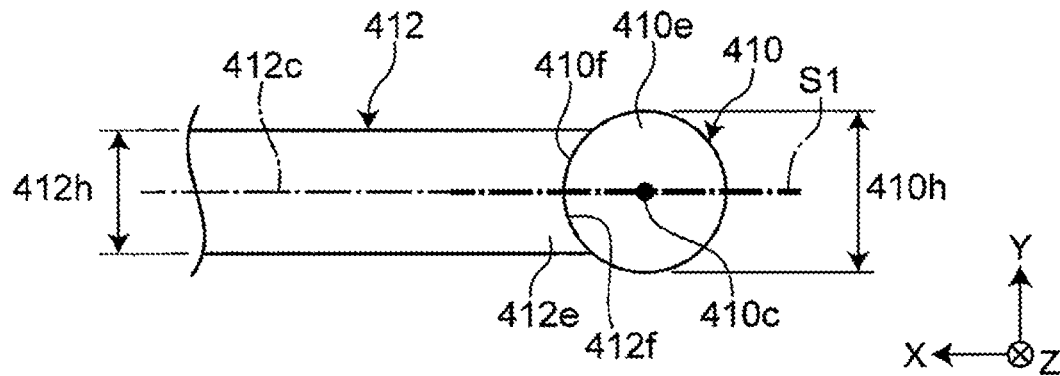
FIG. 6A is an enlarged view of a part A shown in FIG. 3.

FIG. 6A is an enlarged view of a part A shown in FIG. 3, and is a bottom view as observed from the lower side of the part A in the Z-direction. FIG. 6A illustrates a state where the bent pin member 410 and the second straight pin member 412 are assembled, rather than a state where the bent pin member 410 and the second straight pin member 412 are actually welded. As shown in FIG. 6A, an end surface 412f of the end part 412e of the second straight pin member 412 and a peripheral surface 410f of the end part 410e of the bent pin member 410 come into contact with each other.

The shape of each of the bent pin member 410 and the second straight pin member 412 is columnar. That is, the shape of a cross section of each of the bent pin member 410 and the second straight pin member 412 is circular. The term "cross section of the bent pin member 410" refers to a cross section of the bent pin member 410 on a plane orthogonal to a direction in which the bent pin member 410 extends, and the term "cross section of the second straight pin member 412" refers to a cross section of the second straight pin member 412 on a plane orthogonal to a direction in which the second straight pin member 412 extends.

The end part 410e of the bent pin member 410 and the end part 412e of the second straight pin member 412 are parts that are welded to each other. The end surface 412f of the end part 412e of the second straight pin member 412 has a concave curved surface having a shape that fits the peripheral surface 410f of the end part 410e of the bent pin member 410.

As observed from a direction along a center line 410c of the end part 410e of the bent pin member 410 (also referred to as "Z-direction", hereinafter), the width 412h of the second straight pin member 412 is smaller than the width 410h of the bent pin member 410. In this regard, the term "width" as herein refers to a width in a direction orthogonal to a first plane S1 which includes the center line 412c of the end part 412e of the second straight pin member 412 and the center line 410c of the end part 410e of the bent pin member 410. In this embodiment, the diameter of the second straight pin member 412 is smaller than that of the bent pin member 410.

The term "center line 410c of the end part 410e of the bent pin member 410" refers to the center line 410c of a part including the end part 410e in the bent pin member 410. That is, the bent pin member 410 has an approximately U-shaped form and the center line of the bent pin member 410 extends to various directions depending on areas in the bent pin member 410. Therefore, the center line is defined as the center line 410c of the end part 410e of the bent pin member 410. Similarly, the term "center line 412c of the end part 412e of the second straight pin member 412" refers to the center line 412c of a part including the end part 412e in the second straight pin member 412.

Figure 6B:
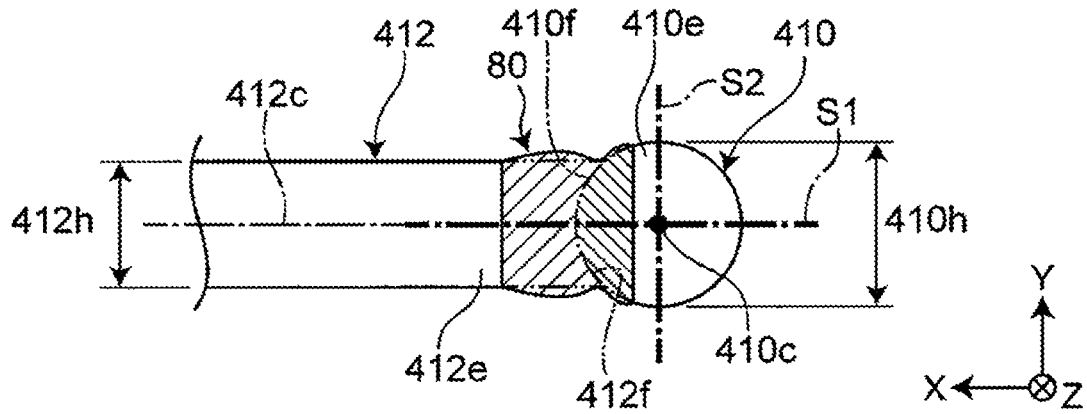
FIG. 6B is a bottom view showing a state where a bent pin member and a second straight pin members shown in FIG. 6A are welded to each other, as observed from the Z-direction.

FIG. 6B shows a state where the bent pin member 410 and the second straight pin member 412 shown in FIG. 6A are actually welded to each other. As shown in FIG. 6B, the second straight pin member 412 and the bent pin member 410 that are adjacent to each other share a welded portion 80 formed by welding the end part 412e of the second straight pin member 412 and the end part 410e of the bent pin member 410 to each other. More specifically, the welded portion 80 is formed by welding the end surface 412f of the end part 412e of the second straight pin member 412 to the peripheral surface 410f of the end part 410e of the bent pin member 410. The welded portion 80 is illustrated with hatching for convenience. When the welded portion 80 is formed, it becomes possible to integrate the end surface 412f of the second straight pin member 412 and the peripheral surface 410f of the bent pin member 410 together into a whole body without forming an interface therebetween. Each of the end surface 412f and the peripheral surface 410f before welding is illustrated with a virtual line for convenience.

The welded portion 80 is a part formed by solidifying a metal that have been made in a liquid form. Therefore, as the result of the agitation of the liquid metal, metal crystals in the welded portion 80 have no orientation. On the other hand, in an area other than the welded portion 80 in the pin members 410, 412, the metal is not melted and therefore metal crystals in the area have an orientation. Therefore, the difference between the welded portion 80 and an area other than the welded portion 80 in the pin members 410, 412 can be confirmed by the observation with naked eyes or the polishing of a cross section.

With respect to a welded portion formed between the first straight pin member 411 and the bent pin member 410 that are adjacent to each other, the same explanation as mentioned above also applies. With respect to the second coil 42, the same explanation as mentioned above also applies. That is, a welded portion formed between the first straight pin member 421 and the bent pin member 420 that are adjacent to each other and a welded portion formed between the second straight pin member 422 and the bent pin member 420 that are adjacent to each other, the same explanation as mentioned above also applies. The same applies to the following description.

Figure 6C:
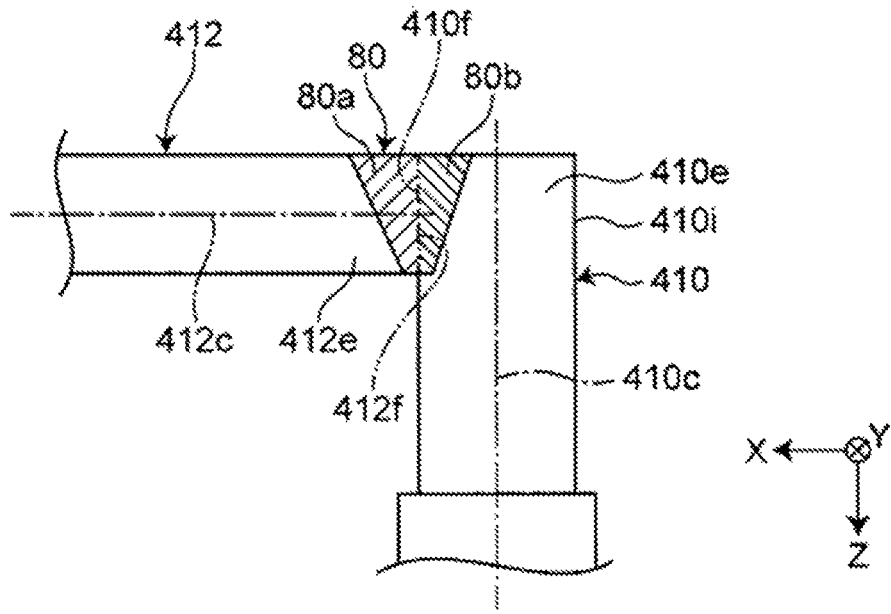
FIG. 6C is a side view of FIG. 6B as observed from the Y-direction.

FIG. 6C is a view of FIG. 6B as observed from the Y-direction. As shown in FIGS. 6B and 6C, the welded portion 80 is not provided in an outer edge 410i of the bent pin member 410 as observed from a direction orthogonal to the first plane S1 (also referred to as "Y-direction", hereinafter).

In this regard, the outer edge 410i of the bent pin member 410 refers to an outer edge located on the opposite side to the end part 412e (inner side) of the second straight pin member 412 as observed from the Y-direction. The bent pin member 410 has a columnar shape. Therefore, the outer edge 410i of the bent pin member 410 corresponds to a line. In the case where the bent pin member 410 has a prismatic shape, the outer edge 410i of the bent pin member 410 corresponds to a plane.

The welded portion 80 is provided further inside than a second plane S2 which includes the center line 410c of the end part 410e of the bent pin member 410 and is orthogonal to the first plane S1 as observed from the Z-direction. In this regard, the wording "further inside than the second plane S2" refers to a side closer to the end part 412e of the second straight pin member 412 than the second plane S2 as observed from the Z-direction.

The welded portion 80 is formed in a triangular shape as observed from the Y-direction. The term "triangular shape" as used herein includes an absolutely triangular shape as well as a substantially triangular shape having a curved angle or side. More specifically, one side of the triangular shape is located in the backward direction of the Z-direction and a corner of the triangular shape is located in the forward direction of the Z-direction as observed from the Y-direction. It is preferred that the welded portion 80 has a conical shape.

The area of the welded portion 80 in the end part 412e of the second straight pin member 412 (also referred to as a "first area 80a", hereinafter) is larger than the area of the welded portion 80 in the end part 410e of the bent pin member 410 (also referred to as a "second area 80b", hereinafter) as observed from the Y-direction. The interface between the first area 80a and the second area 80b is an interface between the end surface 412f and the peripheral surface 410f before welding, each of which is illustrated with a virtual line. The welded portion 80 is provided over the circumference of the peripheral surface of the end part 412e of the second straight pin member 412.

As shown in FIG. 4, it is preferred that the inductor component 1 is further provided with a coat member 90 (shown with a virtual line) that covers a portion of each of the first coil 41 and the second coil 42. More specifically, the coat member 90 covers the electrically conductive body part 411a, 412a, 410a which is exposed from the coating film 410b in the first coil 41 and the electrically conductive body part 421a, 422a, 420a which is exposed from the coating film 420b in the second coil 42. That is, the coat member 90 covers the first and second straight pin members 411, 412, 421, 422 and also covers the welded portion 80. As one example of the material for the coat member 90, a heat-curable epoxy resin can be used.

As shown in FIGS. 3 and 4, bent pin members 410 that are adjacent to each other in the direction of the axis of the first coil 41 are connected to each other by a first connecting member 71. A first straight pin member 411 and a second straight pin member 412 that are adjacent to each other in the direction of the axis of the first coil 41 are connected to each other by a second connecting member 72, and second straight pin members 412 that are adjacent to each other in the direction of the axis of the first coil 41 are connected to each other by the second connecting member 72. Each of the connecting members 71, 72 has heat resistance and bonding properties. For example, a heat-curable epoxy resin is used as the connecting members 71, 72. The same explanation as mentioned above applies to the second coil 42, and the same applies to the following description. Therefore, the explanation is omitted.

According to this configuration, the connecting members 71, 72 can connect pin members that are adjacent to each other in the direction of the axis of the first coil 41, and thereby the pin members that are adjacent to each other in the direction of the axis of the first coil 41 can be made into a block. In this manner, when it is tried to assemble the inductor component 1, the pin members adjacent to each other in the direction of the axis of the first coil 41 can be arranged integrally at predetermined positions. Therefore, the assembling of the pin members can be made simple. Furthermore, the misalignment of relative positions of the pin members adjacent to each other in the direction of the axis of the first coil 41 can be reduced. Therefore, the insulation between the adjacent pin members can be achieved more reliably.

When it is tried to weld pin members adjacent to each other in the circumferential direction of the first coil 41 to each other, the welding can be achieved after arranging pin members adjacent to each other in the direction of the axis of the first coil 41 integrally at predetermined positions. The term "circumferential direction of the first coil 41" refers to a direction in which pin members wound around the core 3 extend. In this manner, the pin members adjacent to each other in the direction of the axis of the first coil 41 can be welded to each other while fixing the relative positions of the pin members. As a result, the welded state of the pin members can be made stable.

Figure 7:
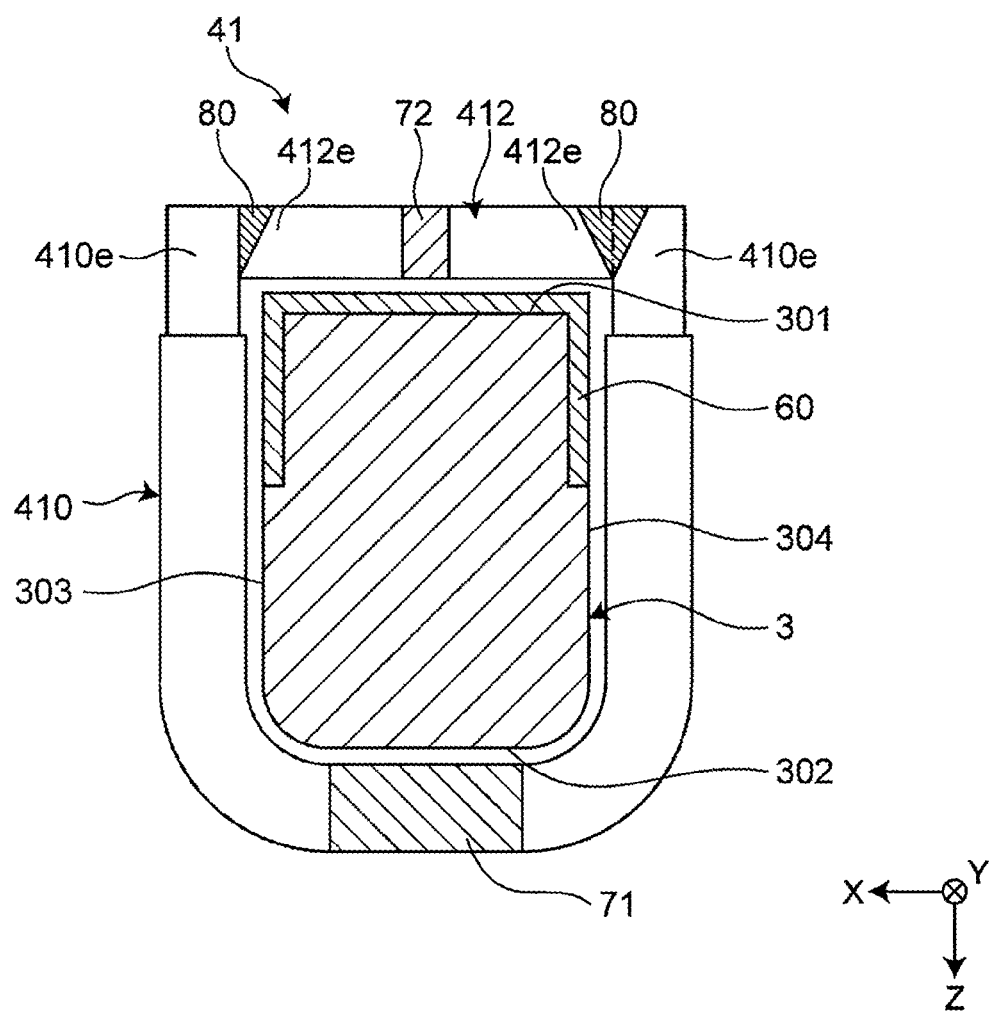
FIG. 7 is a sectional view of the inductor component.

FIG. 7 is a XZ-sectional view of the inductor component. As shown in FIG. 7, a bent pin member 410 and a second straight pin member 412 that are adjacent to each other in the circumferential direction of the first coil 41 share welded portions 80 at which these pin members are welded to each other, and the connecting members 71, 72 are located at different positions from the welded portions 80. According to this configuration, when the bent pin member 410 and the second straight pin member 412 that are adjacent to each other in the circumferential direction of the first coil 41 are welded to each other, the connecting members 71, 72 are less likely to be affected by heat generated as the result of the welding.

It is preferred that the first connecting member 71 is located on a side opposed to the welded portions 80 relative to the core 3. According to this configuration, the connecting member 71 is located at a position apart from the welded portions 80, and therefore the connecting member 71 is less likely to be affected by heat generated as the result of the welding.

It is preferred that the first connecting member 71 is located at a center part of the bent pin member 410 in the direction to which the bent pin member 410 extends. According to this configuration, the first connecting member 71 is located at a position apart from each end (i.e., the welded portion 80) of the bent pin member 410, and therefore the first connecting member 71 is less likely to be affected by heat generated as the result of the welding.

It is preferred that the second connecting member 72 is located at a center part of the second straight pin member 412 in the direction to which the second straight pin member 412 extends. According to this configuration, the second connecting member 72 is located at a position apart from each end (i.e., the welded portion 80) of the second straight pin member 412, and therefore the second connecting member 72 is less likely to be affected by heat generated as the result of the welding. It is preferred that the length of the second connecting member 72 is ¼ to ⅓ inclusive of the whole length of the second straight pin member 412. According to this configuration, because the length of the second connecting member 72 is ¼ or more, the fixing between the adjacent second straight pin members 412 can be retained. Furthermore, because the length of the second connecting member 72 is ⅓ or less, the second connecting member 72 is less likely to be affected by heat generated as the result of the welding.

It is preferred that the first connecting member 71 is located at a position which faces the second end surface 302 of the core 3. According to this configuration, the first connecting member 71 does not affect largely the size of the core 3 in the diameter direction of the core 3. Therefore, the size of the core 3 can be increased in the diameter direction of the core 3.

It is preferred that the second connecting member 72 is located at a position which faces the first end surface 301 of the core 3. According to this configuration, the second connecting member 72 does not affect largely the size of the core 3 in the diameter direction of the core 3. Therefore, the size of the core 3 can be increased in the diameter direction of the core 3.

It is preferred that all of the bent pin members 410 connected by the first connecting member 71 are arranged in parallel with each other and are lined up along the direction of the axis of the first coil 41. According to this configuration, the bent pin members 410 can be lined up, and thereby the coil properties can be improved.

It is preferred that all of the first straight pin members 411 and the second straight pin members 412 connected by the second connecting member 72 are arranged in parallel with each other and are lined up along the direction of the axis of the first coil 41. According to this configuration, the first straight pin members 411 and the second straight pin members 412 can be lined up, and thereby the coil properties can be improved.

It is preferred that, with respect to all of the bent pin members 410 connected by the first connecting member 71, the first connecting member 71 is located at a center part of each of the bent pin members 410 in the direction to which the bent pin members 410 extend. According to this configuration, the moment forces that the bent pin members 410 respectively receive by the first connecting member 71 can be made at the same level in the direction to which the bent pin members 410 extend, and therefore the misalignment of the relative positions of the bent pin members 410 adjacent to each other in the direction of the axis of the first coil 41 can be prevented.

It is preferred that, with respect to all of the first straight pin members 411 and the second straight pin members 412 connected by the second connecting member 72, the second connecting member 72 is located at a center part of each of the first straight pin members 411 and the second straight pin members 412 in the direction to which these pin members extend. According to this configuration, the moment forces that the first straight pin members 411 and the second straight pin members 412 respectively receive by the second connecting member 72 can be made at the same level in the direction to which these pin members extend, and therefore the misalignment of the relative positions of the first straight pin members 411 and the second straight pin member 412 adjacent to each other in the direction of the axis of the first coil 41 can be prevented.

Figure 8:
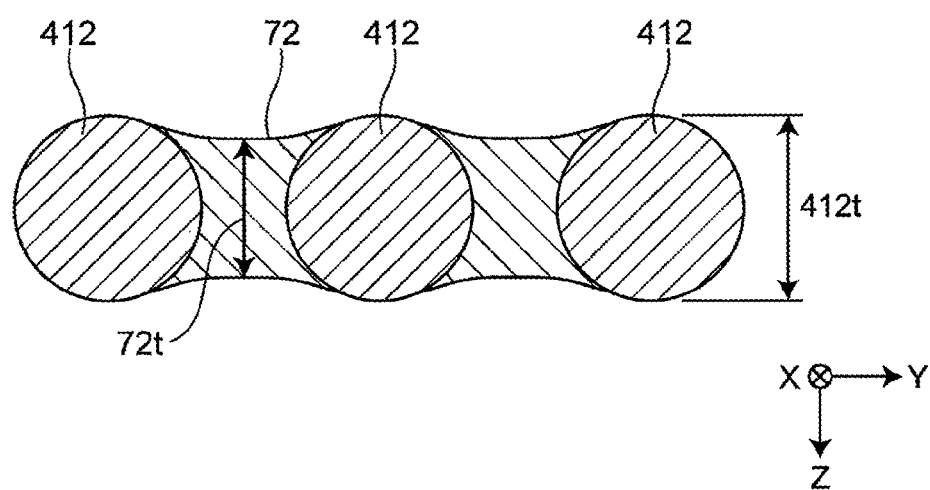
FIG. 8 is a sectional view of the second straight pin member and a second connecting member.

FIG. 8 is a sectional view of the second straight pin members 412 and the second connecting member 72, and is a sectional view that is orthogonal to the circumferential direction of the first coil 41. As shown in FIG. 8, at least a portion of the second connecting member 72 exists between second straight pin members 412 that are adjacent to each other in the direction of the axis of the first coil 41. That is, a gap between the adjacent second straight pin members 412 is filled with the second connecting member 72. The second connecting member 72 may exist on the surfaces of the second straight pin members 412. The same apples to the bent pin members 410 and the first connecting member 71.

According to this configuration, because the second connecting members 72 exists between the second straight pin members 412 that are adjacent to each other in the direction of the axis of the first coil 41, the misalignment of the relative positions of the second straight pin members 412 adjacent to each other in the direction of the axis of the first coil 41 can be reduced. In particular, because each of the second straight pin members 412 is composed of an electrically conductive body part having no coating film, the insulation distance between the second straight pin members 412 adjacent to each other in the direction of the axis of the first coil 41 can be secured effectively by the second connecting member 72.

It is preferred that, as shown in FIG. 8, in a cross section orthogonal to the circumferential direction of the first coil 41, the thickness 72t of a center part between the second straight pin members 412 that are adjacent to each other in the direction of the axis of the first coil 41 in the second connecting member 72 is equal to or less than the thickness of each of the second straight pin members 412 (in this embodiment, the diameter 412t). Each of the thickness 72t of the second connecting member 72 and the thickness of the second straight pin member 412 refers to a length in the core 3 axis direction on a cross section orthogonal to the circumferential direction of the first coil 41.

The same applies to the bent pin members 410 and the first connecting member 71. According to this configuration, the thickness 72t of the second connecting member 72 can be reduced, and thereby the size of the inductor component 1 can be reduced. The thickness of a center part of each of the connecting members as well as the thickness of a part of each of the connecting members existing between adjacent pin members may be equal to or smaller than the thickness of the pin member.

(Method for Manufacturing Inductor Component)

Next, the method for manufacturing the inductor component 1 is described.

As shown in FIG. 4, with respect to the first coil 41, the plurality of bent pin members 410 are arranged in parallel with each other and are then connected integrally by the first connecting member 71, and the plurality of first straight pin members 411 and the second straight pin members 412 are arranged in parallel with each other and are then connected integrally by the second connecting member 72. With respect to the second coil 42, the same procedure as mentioned above is carried out as follows: the plurality of bent pin members 420 are arranged in parallel with each other and are then connected integrally by the first connecting member 71, and the plurality of first straight pin members 421 and the second straight pin members 422 are arranged in parallel with each other and are then connected integrally by the second connecting member 72.

In this regard, a resin paste is used as each of the connecting members 71, 72. The resin paste is applied with a squeegee so as to fill gaps between adjacent pin members. The first connecting member 71 is located at a center part of each of the bent pin members 410 in a direction to which the bent pin members 410 extend. In this manner, it becomes possible to make a force, e.g., a surface tension, received by the bent pin members 410 uniform in a direction to which the bent pin members 410 extend by the action of the resin paste, and it also becomes possible to prevent the misalignment of the bent pin members 410 when the resin paste is dried. Similarly, the second connecting member 72 is located at a center part of each of the first straight pin members 411 and the second straight pin members 412 in a direction to which these pin members 411 and 412 extend. The same applies to the second coil 42.

Subsequently, with respect to the first coil 41, the plurality of first and second straight pin members 411, 412 are arranged on the core 3 in such a manner that end parts of the bent pin members 410 and end parts of the first and second straight pin members 411, 412 can come into contact with each other. Similarly for the second coil 42, the plurality of first and second straight pin members 421, 422 are arranged on the core 3 in such a manner that end parts of the bent pin members 420 and end parts of the first and second straight pin members 421, 422 can come into contact with each other.

In this manner, when it is tried to assemble the inductor component 1, pin members adjacent to each other in the direction of the axes of the first and second coils 41, 42 can be arranged integrally at predetermined positions. As a result, a process for arranging the pin members one by one at the predetermined positions becomes unnecessary, and the assembling of the coils can be completed by a single arrangement procedure. Therefore, the assembling of the pin members can be made simple.

Furthermore, because each of the connecting members 71, 72 exists between adjacent pin members, the plurality of pin members integrated together by each of the connecting members 71, 72 can have rigidity as a whole, and it becomes possible to assemble the pin members without altering the gap distances between the adjacent pin members. Furthermore, the misalignment of the relative positions of the adjacent pin members can be reduced.

The first coil 41 and the second coil 42 are wound around the core 3 in such a manner that the axis of the first coil 41 and the axis of the second coil 42 extend in parallel with each other. The exposed electrically conductive body parts 411a, 412a, 410a of the first coil 41 and the exposed electrically conductive body parts 421a, 422a, 420a of the second coil 42 are arranged on the side of the first end surface 301 of the core 3.

Subsequently, with respect to the first coil 41, the end parts of the bent pin members 410 and the end parts of the first and second straight pin members 411, 412 are welded to each other; and with respect to the second coil 42, the end parts of the bent pin members 420 and the end parts of the first and second straight pin members 421, 422 are welded to each other, while keeping the first end surface 301 of the core 3 in an upward direction.

As mentioned above, because pin members adjacent to each other in the directions of the axes of the first and second coils 41, 42 are arranged integrally at predetermined positions and then end parts of the pin members are welded, it becomes possible to weld the pin members that are adjacent to each other in the directions of the axes of the first and second coils 41, 42 while fixing the relative positions of the pin members, and thereby it becomes possible to make the welded state of the pin members stable. That is, by making the plurality of pin members in a block, the amount of displacement of bonding positions between the pin members can be reduced. As a result, the position of irradiation with laser can become stable and the welding state can also become stable.

In this regard, the first connecting member 71 is located at a center part of each of the bent pin members 410 in a direction to which the bent pin members 410 extend. According to this configuration, the first connecting member 71 is located at a position apart from each of the welded portions 80 located at both ends of the bent pin member 410, and therefore the first connecting member 71 is less likely to be affected by heat generated as the result of the welding. That is, heat generated by the welding is released into the air during the process of heat conduction in the bent pin members 410, and the temperature of heat reaching the first connecting member 71 is decreased, and thereby the influence of the heat on the first connecting member 71 can be reduced. Similarly, the second connecting member 72 is located at a center part of each of the first straight pin members 411 and the second straight pin members 412 in a direction to which these pin members 411 and 412 extend, and therefore the second connecting member 72 is less likely to be affected by heat generated as the result of the welding. The same applies to the second coil 42.

Subsequently, the core 3 and the coils 41 and 42 are attached onto the bottom plate part 21, and then the lid part 22 is placed over these components to house these components in the case 2. In this manner, the inductor component 1 is manufactured. By employing this manufacturing method, it becomes possible to reduce the number of steps for the manufacturing of the inductor component 1 and to manufacture the inductor component 1 more easily.

Second Embodiment

Figure 9:
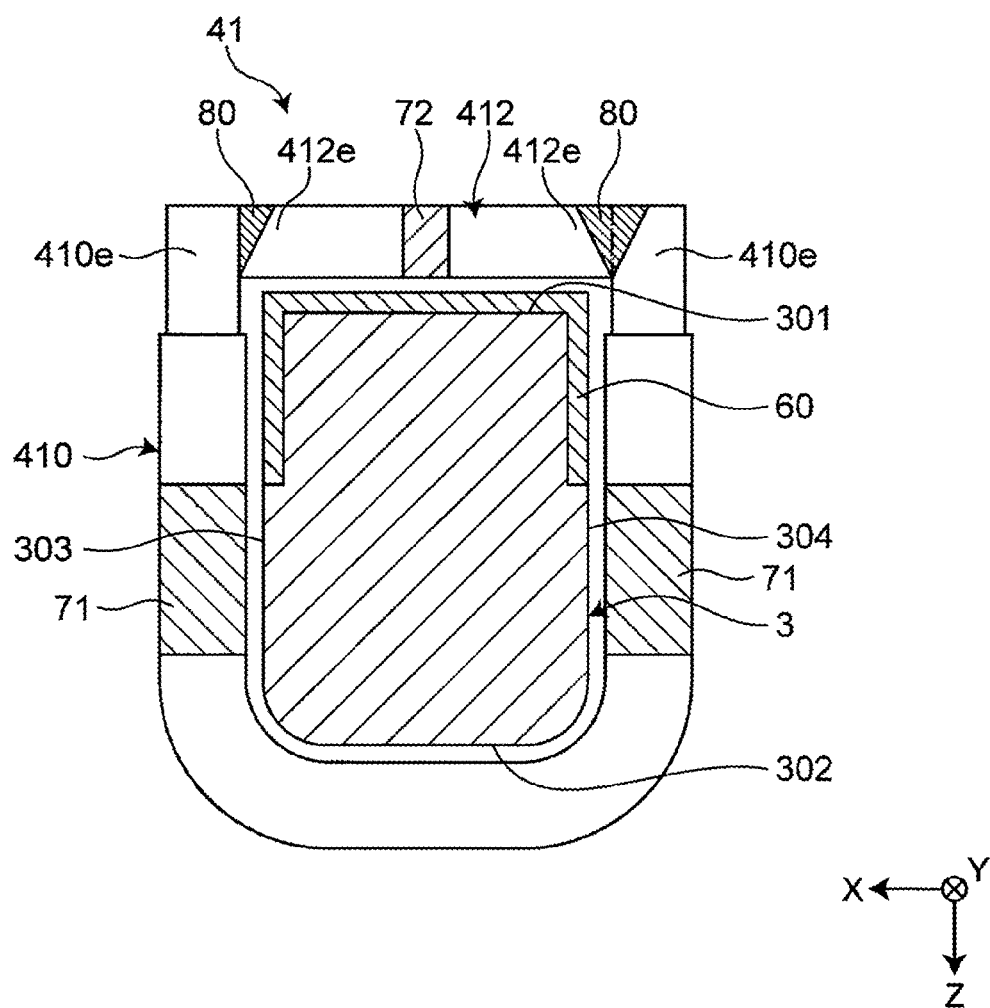
FIG. 9 is a sectional view showing a second embodiment of the inductor component.

FIG. 9 is a sectional view showing a second embodiment of the inductor component. The second embodiment is different from the first embodiment in the positions of the connecting members. This different point in the configuration is described hereinbelow. Other points in the configuration are the same as those of the first embodiment and are indicated using the same symbols as those employed in the first embodiment, and the explanation about the same points in the configuration is omitted.

As shown in FIG. 9, the first connecting member 71 is arranged at positions that respectively face the inner peripheral surface 303 and the outer peripheral surface 304 of the core 3. According to this configuration, the first connecting member 71 is arranged at positions closer to the end parts 410e of the bent pin members 410. Therefore, the positions closer to the end parts 410e of the bent pin members 410 can be fixed by the first connecting member 71, and therefore the misalignment of the positions of the pin members upon welding can be prevented. Furthermore, the size of the core 3 in the direction of the center axis of the core 3 in the inductor component can be reduced. The same applies to the second coil 42. The connecting member may be arranged at positions that respectively face the inner peripheral surface and the outer peripheral surface of the core.

The present disclosure is not limited to the above-described embodiments, and can be modified without departing from the spirit and scope of the present disclosure. For example, the characteristic features of the first and second embodiments may be combined in various ways.

In the first embodiment, the connecting member is located at a position that is opposite to the welded portions relative to the core. However, the connecting member may be located on the same side as that of the welded portions. In the first embodiment, the connecting member is located at a center part of each of the pin members in a direction to which the pin members extend. However, the connecting member may be located at a different position from the center part of each of the pin members in a direction to which the pin members extend.

In the first and second embodiments, in a cross section orthogonal to the peripheral direction of the coil, the thickness of a center part of the connecting member between the pin members adjacent to each other in the direction of the axis of the coil in the connecting member is equal to or less than the thickness of each of the pin members. However, the thickness of the center part of the connecting member may be larger than the thickness of each of the pin members.

In the first and second embodiments, all of pin members connected together by the connecting member are arranged in parallel with each other and are lined up along the direction of the axis of the coil. However, some of the pin members connected together by the connecting member may not be arranged in parallel with each other along the direction of the axis of the coil. In the first embodiment, with respect to all of the pin members connected together by the connecting members, each of the connecting members is located at a center part of each of the pin members in a direction to which the pin members extend. However, each of the connecting members may be located at a different position from the center part of each of the pin members in a direction to which the pin members extend.

In the first and second embodiments, all of the pin members adjacent to each other in the direction of the axis of the coil are connected by the connecting member. However, some of the pin members adjacent to each other in the direction of the axis of the coil may be connected by the connecting member. In the first and second embodiments, both of the first connecting member that connects the first pin members to each other and the second connecting member that connects the second pin members to each other are provided. However, either one of the first and second connecting members may be provided.

In the first and second embodiments, the connecting member exists between pin members adjacent to each other in the direction of the axis of the coil. However, the connecting member may be composed of a sheet material, and a plurality of pin members may be arranged on and bonded to one surface of the sheet material.

In the first and second embodiments, two pin members are integrated together to form a single turn of the coil. However, a single pin member may constitute a single turn of the coil. Alternatively, three of more pin members may be integrated together to form a single turn of the coil. As mentioned above, the shape of each of the pin members is not limited to an I-shaped form or a U-shaped form, and may be a shape constituting a single turn or a shape of a segment of a single turn which is formed by dividing a single turn into a plurality of segments. In the case where the pin members are divided into three or more groups composed of a plurality of pin members, the divided pin members are connected to each other by the connecting member for groups, or the divided pin members in some of the groups may not be connected to each other by the connecting member.

In the first embodiment, the connecting member is left in a final product in the method for producing the inductor component. However, the connecting member may be removed from the final product.

What is claimed is:

1. An inductor component comprising:
   a ring-shaped core;
   a coil including a plurality of members, and in which adjacent members are connected to be wound around the core to configure the coil, members of the plurality of members that are adjacent to each other in a circumferential direction of the coil share a welded portion at which the members are welded to each other, and each turn that includes three of the plurality of members includes two welded portions; and
   a connecting member which connects only two of the members adjacent to each other in a direction of an axis of the coil, the connecting member is positioned directly between the two welded portions, and the connecting member exists only between members adjacent to each other in a direction of an axis of the coil.

2. The inductor component according to claim 1, wherein the connecting member is located at a different position from the welded portion.

3. The inductor component according to claim 2, wherein the connecting member is arranged at a position to face at least one of an inner peripheral surface and an outer peripheral surface of the core.

4. The inductor component according to claim 2, wherein the connecting member is located at a center part of each of the members in an extending direction of the member.

5. The inductor component according to claim 2, wherein the core has a first end surface and a second end surface which face each other in a direction of a center axis of the core, and
   the connecting member is arranged at a position to face the first end surface or the second end surface.

6. The inductor component according to claim 2, wherein all of the members connected by the connecting member are arranged in parallel with each other and are placed along a direction of an axis of the coil.

7. The inductor component according to claim 1, wherein the connecting member is arranged at a position to face at least one of an inner peripheral surface and an outer peripheral surface of the core.

8. The inductor component according to claim 2, wherein the connecting member is located on an opposite side to the welded portion with respect to the core.

9. The inductor component according to claim 7, wherein the connecting member is located at a center part of each of the members in an extending direction of the member.

10. The inductor component according to claim 7, wherein the core has a first end surface and a second end surface which face each other in a direction of a center axis of the core, and
    the connecting member is arranged at a position to face the first end surface or the second end surface.

11. The inductor component according to claim 7, wherein all of the members connected by the connecting member are arranged in parallel with each other and are placed along a direction of an axis of the coil.

12. The inductor component according to claim 1, wherein the connecting member is located at a center part of each of the members in an extending direction of the member.

13. The inductor component according to claim 1, wherein in a cross section orthogonal to a circumferential direction of the coil, a thickness of a portion of the connecting member which exists between members adjacent to each other in a direction of an axis of the coil is equal to or less than a thickness of each of the members.

14. The inductor component according to claim 1, wherein the core has a first end surface and a second end surface which face each other in a direction of a center axis of the core, and
    the connecting member is arranged at a position to face the first end surface or the second end surface.

15. The inductor component according to claim 1, wherein all of the members connected by the connecting member are arranged in parallel with each other and are placed along a direction of an axis of the coil.

16. The inductor component according to claim 15, wherein with respect to all of the members connected together by the connecting member, the connecting member is located at a center part of each of the members in an extending direction of the member.

17. A method for manufacturing an inductor component, the inductor component including a ring-shaped core, and a coil which comprises a plurality of first members and a plurality of second members, and in which a first member and a second member adjacent to each other are connected to each other to be wound around the core, and the method comprising:

arranging the plurality of first members in parallel with each other and providing a first connecting member only between adjacent first members, and connecting the first members integrally by the first connecting member, and arranging the plurality of second members in parallel with each other and providing a second connecting member only between adjacent second members, and connecting only two of the second members integrally by the second connecting member;

arranging the plurality of first members and the plurality of second members around the core in such a manner that an end part of each of the first members and an end part of each of the second members are in contact with each other; and welding the end part of each of the first members and the end part of each of the second members to each other such that a turn includes at least one first member and at least one second member, each turn including two welded portions, and the connecting member is positioned directly between the two welded portions.

* * * * *